United States Patent
Saxena et al.

(10) Patent No.: US 9,853,921 B1
(45) Date of Patent: Dec. 26, 2017

(54) SECURE ACCOUNT COMMUNICATION MANAGEMENT

(71) Applicant: Amazon Technologies, Inc., Reno, NV (US)

(72) Inventors: Avinash Chandra Saxena, Bellevue, WA (US); Joseph Sirosh, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 525 days.

(21) Appl. No.: 13/733,074

(22) Filed: Jan. 2, 2013

(51) Int. Cl.
| G06F 3/00 | (2006.01) |
| H04L 12/58 | (2006.01) |
| G06Q 10/10 | (2012.01) |
| G06F 3/0482 | (2013.01) |
| G06F 15/16 | (2006.01) |

(52) U.S. Cl.
CPC ............ H04L 51/00 (2013.01); G06F 3/0482 (2013.01); G06F 15/16 (2013.01); G06Q 10/10 (2013.01)

(58) Field of Classification Search
CPC ..... H04L 12/581; H04L 51/00; G06F 3/0482; G06Q 20/20
USPC .................................................. 715/752, 962
See application file for complete search history.

(56) References Cited

U.S. PATENT DOCUMENTS

| 2002/0095454 A1* | 7/2002 | Reed ................. G06Q 30/0601 709/201 |
| 2006/0195364 A1* | 8/2006 | Shroff ................. G06Q 10/083 705/26.3 |
| 2007/0097655 A1* | 5/2007 | Yampolsky ............ G06Q 10/10 361/737 |
| 2008/0301009 A1* | 12/2008 | Plaster ................... G06Q 30/06 705/28 |
| 2011/0173522 A1* | 7/2011 | Gupta ........................... 715/205 |
| 2012/0260194 A1* | 10/2012 | Kennedy et al. ............. 715/752 |
| 2012/0303425 A1* | 11/2012 | Katzin et al. ................ 705/14.4 |

* cited by examiner

*Primary Examiner* — Joy M Weber
(74) *Attorney, Agent, or Firm* — Kilpatrick Townsend & Stockton LLP

(57) ABSTRACT

Messages for customers and/or third parties may be generated and/or stored by a service provider. The messages may include user information associated with a resource or an account of a user. In some aspects, a message containing at least a portion of the user information may be provided to the user. The message may be configured to enable the user to associate information with the message. The service provider may receive an indication of the association between the information and the message. Based at least in part on the received indication, the service provider may perform an action corresponding to the action.

17 Claims, 7 Drawing Sheets

SECURE ACCOUNT COMMUNICATION MANAGEMENT

BACKGROUND

With the growth of the Internet, websites and other web services that manage user accounts have become ubiquitous. Such sites and/or services may provide various ways for users to interact with other users over the web, for example, to sell items, provide digital content and/or resources, or the like. These sites and/or services may also provide the ability for user's to manage account-specific information and/or other private information that should not be shared with other users or third-parties. To access this private information, many websites may require a user to log in or otherwise be authenticated first. However, providing such account-specific and/or private information may pose challenges to the websites and/or the service providers.

BRIEF DESCRIPTION OF THE DRAWINGS

Various embodiments in accordance with the present disclosure will be described with reference to the drawings, in which.

DETAILED DESCRIPTION

Figure 1:
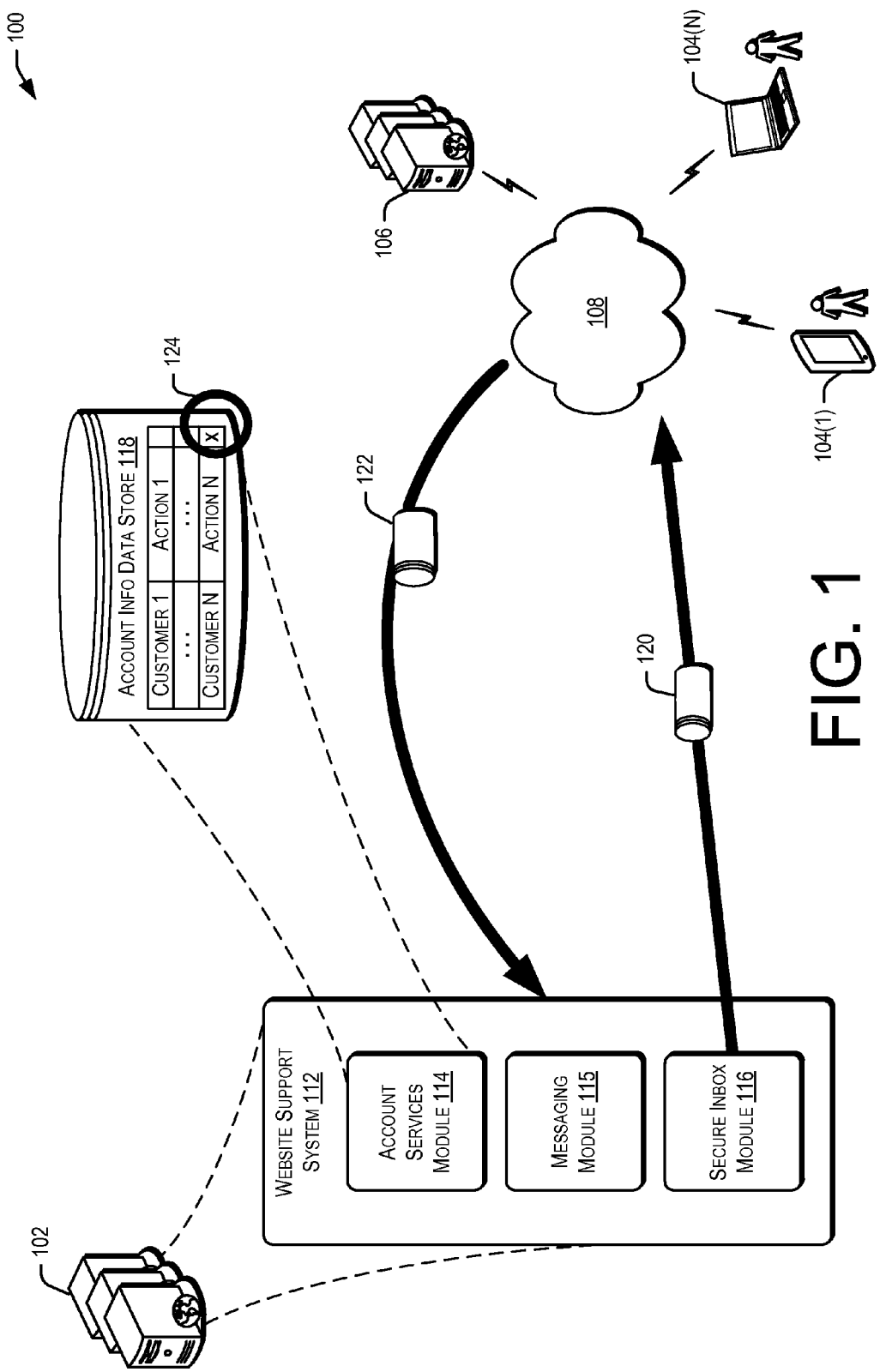
FIG. 1 illustrates an example architecture for implementing the secure account communication management techniques described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing secure techniques for managing communications of a website and/or a web service provider. In some examples, a message may be prepared and/or intended for third-party service providers, account holders, and/or other users of the website and/or service provider. Additionally, in some aspects, the message may be generated to include private or other account-specific information for the user. The messages may be electronic mail (hereinafter, "email") messages using any known or proprietary protocols, or messages prepared based at least in part on other formats (e.g., text messages, instant messages, etc.). The messages may, in some examples, be securely stored in a local storage device or local mail server (e.g., a Post Office Protocol 3 (POP3) server or an Internet Message Access Protocol (IMAP) server). Alternatively, the local mail server may be configured to operate utilizing either or both POP3 or IMAP protocols and/or one or more different proprietary protocols. Once stored, the message may be provided to a user or a computing device associated with an account holder.

In some aspects, the account messages may be configured to enable the user to provide one or more tags or other information associated with the message, the user's account, and/or one or more resources associated with the message or the account. For example, and without limitation, the message may include a printing label or other digital item for the user to consume, and the tag or information provided by the user may be an indication that the label has been printed and/or that the item has been shipped. Other examples may include, but are not limited to, situations where the message may contain order information associated with a purchased item of the user, and the provided information (e.g., as a tag or other association) may include the user's (i.e., the seller's) order number. In this way, the provider of the message (which may, in some examples, manage account information of the user) may be able to associate the user's order number with the internal order number used (e.g., an order number generated by the website). In some aspects, upon receipt of the tag or other information, the website and/or service provider may perform an action on one or more resources associated with the user or the account. The action may be based at least in part on the provided tag or other information. Additionally, in some cases, the action to be performed may be configured by the user and/or may be performed automatically in response to receipt of the tag from the user.

In some examples, a user may be associated with an account (e.g., a seller's account) of a website configured to provide items to other users. The items may be for sale, for rent, for online consumption, available for viewing, etc., by other users and/or third-parties. In some aspects, the website may manage private or otherwise personal information associated with the account and/or the related users (e.g., the sellers and/or the consumers). As such, it may be important to manage the private or otherwise personal information in such a way that it is only accessed by authorized and/or authenticated users. In some examples, the information may be maintained securely by only allowing access to such information via a web interface. Login credentials may be verified prior to access being granted. However, in other examples, the private or otherwise personal information may be provided in messages (e.g., emails or the like). As such, users or other third parties that wish to receive such proprietary information may be requested to create email accounts with the website or service provider. Future messages may then be provided to computing devices associated with these email accounts. Further, once the emails are sent, the website or service provider may receive the tags or other information referenced above as a result of the user interacting with the message. For example, the users may receive the messages via their own email clients (e.g., email clients being executed by the user's computing device or web interface email clients), and may be presented with an interface that allows them to provide tags, text, images, or other information associated with the account or the message. For security purposes, the website or service provider may be configured to delete the messages from the email accounts once the user has received the messages at the email clients.

By managing the account communications in such a secure way, the website and/or service provider may be able to minimize unauthorized access of the private and/or personal information. Additionally, the secure email servers of the service providers that store the messages may be configured to bubble the emails up and/or down automatically based at least in part on the user and/or account information, as well based at least in part on whether the user has reviewed and/or provided tags associated with the messages. In other words, the service providers may able to identify when a user has actually received the messages. Bubbling, in this context, refers to re-ranking the list emails based at least in part on one or more factors, and then presenting the list of emails according to the new ranking. Messages may be automatically deleted as well. In some aspects, stale messages may be replaced with more current messages (e.g. notifications), third-party accounts may be white-listed or black-listed, old or irrelevant emails may be removed automatically, and/or secure information that may not normally be provided via email can be safely sent to users (e.g., order information, payment information, shipping information, and/or deep links that access secure content).

FIG. 1 depicts an illustrative architecture 100 in which techniques for the secure account communication management discussed herein may be implemented. These techniques are described in more detail below in connection with at least FIGS. 2-7. Returning to FIG. 1, the illustrative architecture 100 includes one or more service provider computers 102 accessible by one or more user devices 104(1)-(N) (collectively, "user devices 104") and/or one or more third-party computing devices 106 over one or more networks 108. By way of example only, the service provider computers 102 may provide websites, web services, and/or distributed computing resources that may include client instances (e.g., virtual computing devices), data centers, web servers, or the like. In some examples, a website of the service provider computers 102 may provide account management for users that may provide one or more resources to other users (e.g., in an electronic marketplace or the like).

In some examples, the networks 108 may include any one or a combination of many different types of networks, such as cable networks, the Internet, wireless networks, cellular networks, and other private and/or public networks. While the illustrated example represents the user devices 104 and/or the third-party computers 106 accessing the service provider computers 102 over the networks 108, the described techniques may equally apply in instances where the user devices 104 and/or the third-party computers 106 interact with the service provider computers 102 wirelessly, using fiber optics, or any other communication type, or in any other manner. It is also noted that the described techniques may apply in other client/server arrangements (e.g., set-top boxes, etc.), as well as in non-client/server arrangements (e.g., locally stored applications, etc.).

In some aspects, the service provider computers 102 may be any type of computing devices such as, but not limited to, mobile, desktop, thin-client, virtual, and/or cloud computing devices. In some examples, the service provider computers 102 may be in communication with the user devices 104 and/or the third-party computers 106 as noted above via the networks 108, or via other network connections. The service provider computers 102 may include one or more computing resources, perhaps arranged in a cluster, as a server farm, as individual servers not associated with one another, or not as servers at all (e.g., as virtual computing devices). These resources may be configured to perform the secure account communication management as part of an integrated, distributed computing environment. Additionally, the service provider computers 102 may include (e.g., stored in memory and executable by one or more processors) a website support system 112 that at least includes a network of computing resources that are collectively configured to operate a website. The website support system 112 may also be configured to implement features of the secure account communication management described herein.

More specifically, in some examples, the website support system 112 may be supported by an account services module 114, a messaging module 115, and/or a secure inbox module 116. As used herein, modules may refer to programming modules executed by servers or clusters of servers that are part of a service. In this particular context, the modules may be executed by the servers or clusters of servers that are part of the website support system 112. The account services module 114 may be configured to manage account information associated with the users and/or the user devices 104. For example, the account services module 114 may store or otherwise manage the login information and/or security credentials of the users. The account services module 114 may also be configured to manage any information about what items or services are provided by each user and/or account. For example, if a user's account is generally set up to provide accounting advice, the account service module 114 may store tables or lists of the user's customers' payment information (e.g., credit card information, billing address information, etc.) and/or of the user's previous accounting advice (e.g., stock or standard advice, configurable advice, past advice specifically determined for a customer, etc.). Further, if the user provides customers the ability to purchase shoes through the website support system 112, the account services module 114 may manage inventories, prices, reviews, etc., associated with the shoes, as well as specific customer information, as desired. However, other and/or separate modules may be utilized for performing some or all of each of these various functions. For example, a separate inventory module may be configured to manage a user's inventory, a separate pricing module may be configured to handling pricing of items, etc.

In some examples, the account services module 114 may also be configured to manage an account information data store 118. The account information data store 118 may be configured to store at least some of the information described above including, but not limited to, account information, user information, order information, payment information. However, the account information data store 118 may also be configured to store other account information such as, but not limited to, white lists of other users that the account holders have approved (e.g., other users that should get the messages and/or other users allowed to provide messages to the account holders), black lists of other users that the account holders have blocked, and/or actions that are expected to be performed by the account holders. For example, after an item is sold, an account holder may be expected to contact the buyer. Alternatively, in addition, after a user asks an account holder a question, the account holder may be expected to respond. As such, contacting buyers, responding to questions, shipping items, accepting payments, etc., may all be actions that may be, at some point, expected by an account holder. These actions may be stored and/or updated in the account information data store 118 as well. For example, as show in FIG. 1, one column of the account information data store 118 may correspond to different customers (e.g., account holders), one column may correspond to actions to be expected by corresponding customers, and/or one column may indicate when the action has been performed. These resources (e.g., the account information and/or the account information data store 118) may be updated or otherwise have actions performed on them based at least in part on the tags of the messages, associations made within the messages, and/or configuration settings provided by the account holders.

In one non-limiting example, the messaging module 115 of the website support system 112 may generate a message to a user (i.e., an account holder or customer) based at least in part on an indication that a message should be sent. For example, a buyer may purchase one or more items provided by a website of the website support system 112 that are being provided by the user. As such, an email with order information may be generated and an action (e.g., read the email) may be generated and stored in the account information data store 118. Additionally, in some examples, the message may be generated in the secure inbox module 116 and/or it may be stored in the secure inbox module 116. Further, the secure inbox module 116 may be configured to provide the message 120 (e.g., one or more data packets) to the appropriate user computing device 104 via the one or more networks 108. Upon receipt of the message 120 and, in some cases, at least in response to interacting with the message, another message 122 (e.g., another data packet, set of data packets, or the like) may be provided from the user computing device 104 to the website support system 112. The message 122 may be received by the account services module 114, the secure inbox module 116, or some other component of the website support system 112 configured to received such information. In some examples, the message 120 may be provided based at least in part on a known message protocol (e.g., IMAP, POP3, or the like), while the returned message 122 (e.g., a tag or association) may be provided in any known message protocol (e.g., IMAP, POP3, etc.), in some other known Internet protocol (e.g., transmission control protocol (TCP)), or even based at least in part on a proprietary protocol utilized by the website support system 112. Once received by the website support system 112, an action may be performed by the service provider computers 102 on a resource associated with the account (e.g., updating an indication in the account information data store 118, shown at 124). Additionally, the action may include performance of other instructions associated with the account including, but not limited to, deleting an email managed by the secure inbox module 116, moving an email up or down in the secure inbox module 116, adding a user to a white list, black list, list of authorized users, etc., or the like.

Figure 2:
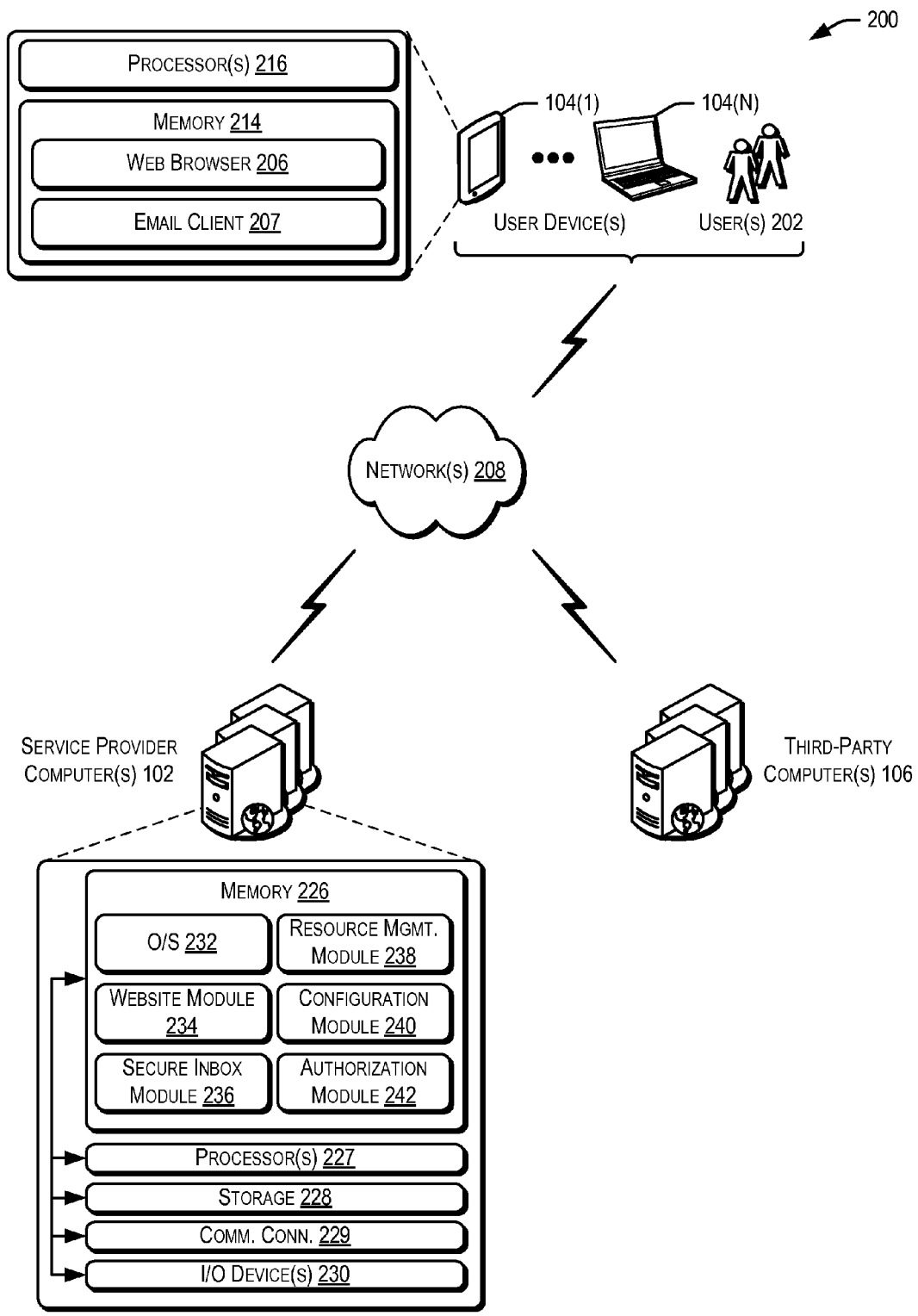
FIG. 2 illustrates another example architecture for implementing the secure account communication management techniques described herein, according to at least one example.

FIG. 2 depicts an illustrative system or architecture 200 in which techniques for managing secure account communication may be implemented. In architecture 200, one or more customers and/or users 202 (i.e., account holders) may utilize user computing devices 104 as described with reference to FIG. 1 to access a web browser 206, or a user account accessible through the web browser 206, via one or more networks 208. In some aspects, the web browser 206 and/or user account may be hosted, managed, and/or otherwise provided by a computing resources service or service provider, such as by utilizing one or more service provider computers 102 as described with reference to FIG. 1. In some examples, a customer may own, manage, operate, control, or otherwise be responsible (e.g., financially) for one or more accounts, groups of accounts, and/or sub-groups of accounts. The one or more service provider computers 102 may, in some examples, provide computing resources such as, but not limited to, web hosting, client entities, data storage, data access, management, virtualization, etc. In some aspects, a processing entity may be virtual and/or data volumes may be stored virtually within a distributed computing system operated by the one or more service provider computers 102. The one or more service provider computers 102 may also be operable to provide web hosting, email hosting, online catalogs, product reviews, combinations of the foregoing, or the like to the one or more users 202.

In some examples, the networks 208 may include any one or a combination of many different types of networks, such as cable networks, the Internet, wireless networks, cellular networks, and other private and/or public networks. While the illustrated example represents the users 202 accessing the web browser 206 over the networks 208, the described techniques may equally apply in instances where the users 202 interact with a service provider computer 102 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, mobile applications, etc.).

As described briefly above, the web browser 206 may allow the users 202 to interact with a service provider computer 102, such as to store, access, and/or manage data, develop and/or deploy computer applications, host web content, and/or provide items for consumption or sale. The one or more service provider computers 102, perhaps arranged in a cluster of servers or as a server farm, may host the web browser 206. Other server architectures may also be used to host the web browser 206. The web browser 206 may be capable of handling requests from many users 202 and serving, in response, various user interfaces that can be rendered at the user devices 104 such as, but not limited to an email client 207. The web browser 206 can access and/or render any type of website that supports user interaction, including social networking sites, online retailers, informational sites, blog sites, search engine sites, news and entertainment sites, and so forth. As discussed above, the described techniques can similarly be implemented outside of the web browser 206, such as with other applications running on the user devices 104.

As noted above, the architecture 200 may include one or more user devices 104. The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 102 via the networks 208, or via other network connections.

In one illustrative configuration, the user devices 104 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 214 may store program instructions that are loadable and executable on the processor(s) 216, as well as data generated during the execution of these programs. Depending on the configuration and type of user device 104, the memory 214 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the email client 207 (e.g., a dedicated smart phone application, a tablet application, a web application, etc.) and/or the web browser 206. The web browser may be configured to receive, store, and/or display a website or other interface for interacting with the service provider computers 102. The web browser may also be configured to provide one or more tags, email associations, or other information (e.g., in one or more data packets) associated with received emails, account information, or the like. The email client 207 may be configured to receive email messages or other messages from the service provider computers 102, the one or more third-party computers 106, or other computing devices (e.g., web-based email clients or other email servers). Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 104.

In some examples, the service provider computers 102 may also be any type of computing devices such as, but not limited to, mobile, desktop, thin-client, and/or cloud computing devices, such as servers. In some examples, the service provider computers 102 may be in communication with the user devices 104 and/or the third-party service provider computers 106 via the networks 208, or via other network connections. The service provider computers 102 may include one or more servers, perhaps arranged in a cluster, as a server farm, or as individual servers not associated with one another. These servers may be configured to host a website (or combination of websites) viewable via the user devices 104 or a web browser accessible by a user 202. Additionally, in some aspects, the service provider computers 102 may be configured to perform the management of secure account communications as part of an integrated, distributed computing environment.

In one illustrative configuration, the service provider computers 102 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of service provider computers 102, the memory 226 may be volatile (such as RAM) and/or non-volatile (such as ROM, flash memory, etc.). The service provider computers 102 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the service provider computers 102 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 102 may also contain communications connection(s) 229 that allow the service provider computers 102 to communicate with a stored database, another computing device or server, user terminals and/or other devices on the networks 208. The service provider computers 102 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232 and/or one or more application programs or services for implementing the features disclosed herein including a website module 234, an secure inbox module 236, a resource management module 238, a configuration module 240, and/or an authorization module. In some examples, the website module 234 may be configured to provide web content (e.g., portions of web pages, images, links, etc.) to the web browser 206 or other web browser accessible via the networks 208. Additionally, the website module 234 may be configured to enable the users 202 to provide content and/or items (e.g., via an online catalog of items, some of which may be for sale) to other users. The website module 234 may also be configured to generate email messages to the users 202 based at least in part on accounts of, customers of, and/or items provided by of the users 202. The website module 234 may also receive messages bound for the users 202 (e.g., received from the third-party computers 106 or other users) and/or tags, text, or other associations provided by the users 202 (e.g., in response to secure emails sent by the service provider computers 102 to the users 202). In some aspects, the secure inbox module 236 may be configured to store the email messages that are generated and/or received by the website module 234. In this way, the service provider computers 102 may control the email content in a secure fashion and/or in such a way that the content may contain private, personal, or otherwise proprietary information. The messages may then be managed by the secure inbox module 236 (e.g., filtered, moved, forwarded, deleted, etc.) automatically, with or without interaction from the users 202. Additionally, in some aspects, the tags or other information associated with the emails (i.e., the information provided back from the users 202 as a result of interaction with the messages) may be received by the secure inbox module 236 instead of or in addition to the website module 234. As indicated, these tags or other information may be formatted as email messages or based at least in part on any other protocol (including) proprietary protocols of the service provider computers 102.

In some examples, the resource management module 238 may be configured to manage account resources (e.g., actions to be performed on web content and/or lists/accounts of the users 202). That is, the resource management module 238 may manage or otherwise be responsible for the data of the account information data store 118 described with reference to FIG. 1. Additionally, in some examples, the configuration module 240 may be configured to manage user configurations, settings, and/or other options selected by the users 202. For example, a user 202 may configure the secure inbox module 236 to only send emails from IP addresses or other computing devices that exist on a white list of approved senders. The user 202 may also configure the white list (or a black list) of addresses, users, or other entities that they do or do not want to receive messages from. As such, the configuration module 240 may be configured to manage such lists, provide configuration options to the user 202, and/or automatically configure settings of the user 202 based at least in part on other settings, actions taken by the user 202, and/or other information. In some aspects, neural networks, machine learning, and/or other techniques may be utilized to provide such automatic configuration. Further, in some examples, the authorization module 242 may be configured to store user 202 and/or account credentials. The authorization module 242 may also manage one or more lists or sets of email addresses that are associated with a particular account and/or information that indicates which of the email addresses are authorized to receive which portions of the user 202 emails. For example, an accountant email address may be associated with a user 202 account such that the accountant email is authorized to receive financial information and/or payment information associated with the account of a user 202. While, on the other hand, a marketing email address may only be authorized to receive product and/or catalog information of the account.

In some examples, one or more seller accounts of the service provider computers 102 may be registered or otherwise created by the website module 234 and/or the secure inbox module 236. Additionally, multiple (e.g., categorized) inboxes may be created for each account based at least in part on preferences and/or settings of a user 202. Alternatively, or in addition, the secure inbox module 236 may also generated additional inboxes for each account automatically. Further, emails generated and/or stored it he secure inbox module 236 may be automatically prioritized, filtered, rated, reviewed, or otherwise managed for the users 202 based at least in part on machine learning or other techniques, such that the user may set one or more preferences, and the habits, actions, and/or preferences of the user 202 may be utilized to further inform the secure inbox module 236 of what actions to take on stored messages. In some examples, the secure emails may include links to secure pages of the website. However, if a user 202 access the link from the secure email, the content of the secure page may be provided to the user 202 without requesting any login credentials.

In some aspects, global selling settings may be configured via the configuration module 240 such that different laws (e.g., privacy, tax, content) may be followed for users of different countries and/or for emails being sent to different countries. Further, automatic translation may be employed to translate messages destined for a foreign country and/or a non-English-speaking user. In some examples, regardless of the global settings, the configuration module 240 may determine when and/or what to do with stored messages. For example, the message may be deleted, the message may be sent to the intended recipient, and/or the message may be forwarded to other email clients. Additionally, in some cases, only private, personal, and/or proprietary information will be included in messages if the destination address is associated with an authenticated device and/or user.

Further, in some cases, a user 202 may receive an email from the secure inbox module 236 that is associated with a resource (e.g., a shipping address, payment information, etc.). The email may be configured such that it enables the user 202 to indicate a tag or association between the resource and the message. For example, the user 202 may receive a message that includes a shipping label. The user 202 may be able to tag the message as "printed." In this non-limiting example, the "printed" tag may be provided back to the service provider computers 102 as an email, as a web page, as a data packet, etc. Upon receipt of the tag, the website module 234 and/or the secure inbox module 236 may be configured to perform one or more actions based at least in part on the tag. For example, the item may be indicated as shipped, and email with tracking information (e.g., if the tracking information is provided by the user 202 as a tag or other message association) may be sent to the buyer, the email may be deleted, etc.

A few additional examples of the operations of the service provider computers 102 are also described in greater detail below with reference to FIGS. 3-7.

Figure 3:
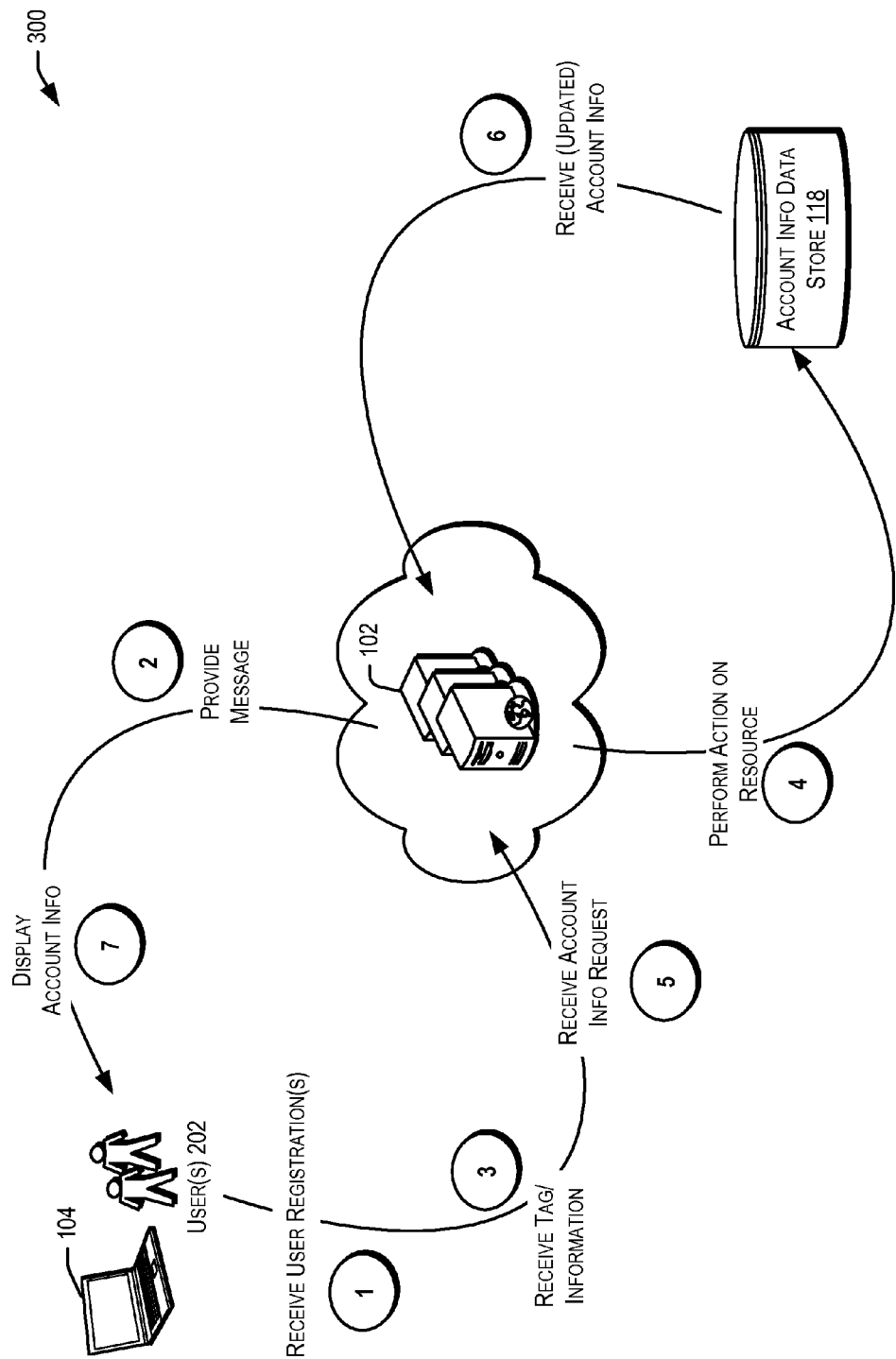
FIG. 3 illustrates an example flow diagram of techniques for implementing features of the secure account communication management described herein, according to at least one example.

FIG. 3 illustrates another example flow diagram showing one or more techniques 300 for secure account communication management, as described herein. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the one or more service provider computers 102 described above with reference to FIGS. 1 and 2 may receive registrations of a user 202 (e.g., a registration of one or more user devices 104 associated with the user 202). Based at least in part on the registered user accounts, one or more messages may be generated, stored locally (e.g., in a secure email server), and/or provided to the registered user devices 104. As a result of the user 202 interacting with the message, the service provider computers 102 may receive a tag or other information associated with the user, the message, and/or a resource referenced by the message.

In some aspects, based at least in part on the received tag, the service provider computers 102 may perform one or more associated actions on a resource (e.g., via accessing the account information data store 118 of FIGS. 1 and 2). The service provider computers 102 may then receive updated account information (e.g., an updated email, an updated list of recipients, an updated list of items to be provided, etc.) from the account information data store 118. The information may have been updated based at least in part on action that was previously performed. In some examples, the service provider computers 102 may display or otherwise provide the updated account information to the users 202 via the one or more user devices 104.

Figure 4:
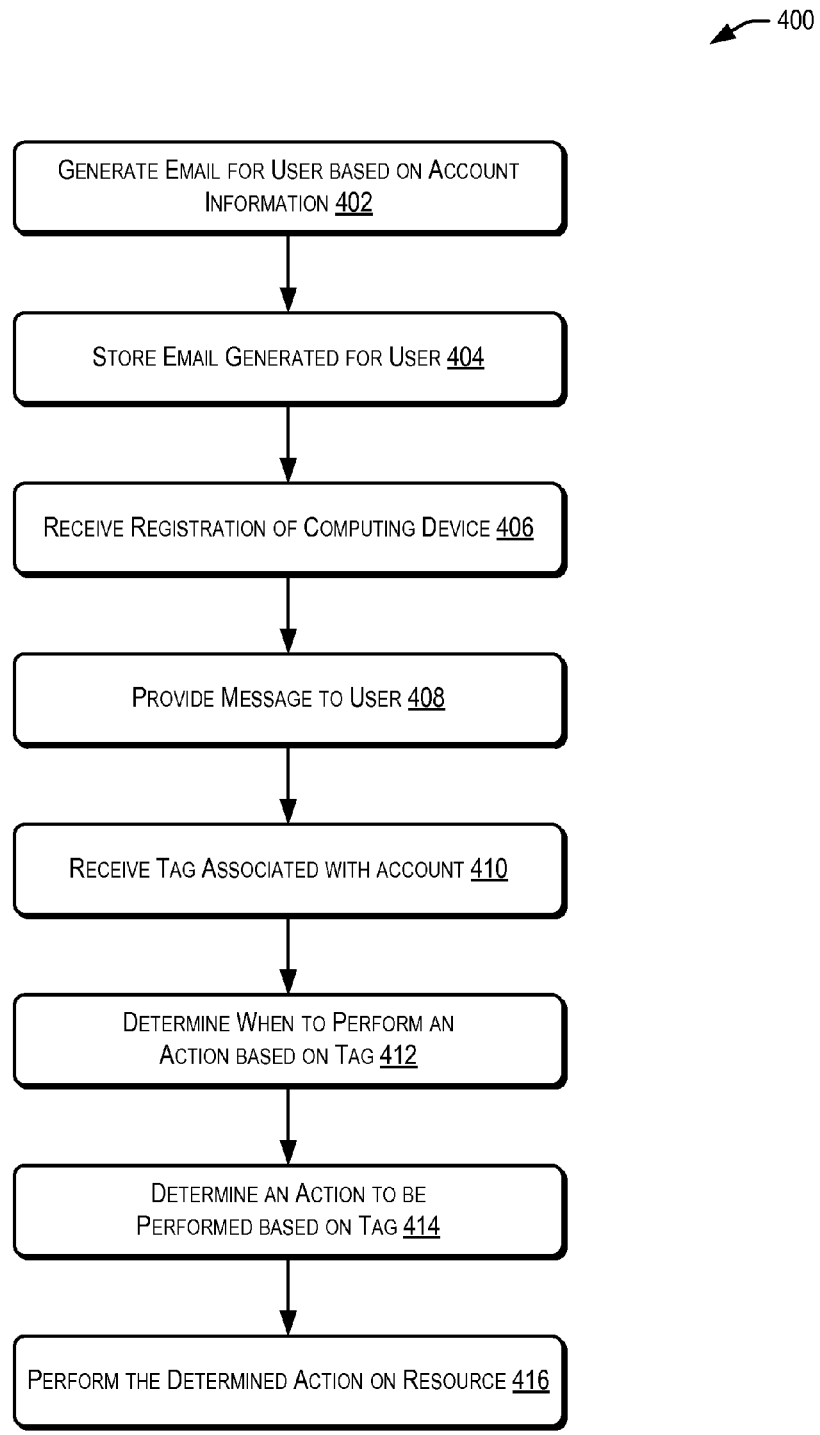
FIG. 4 illustrates an example flow diagram of a process for implementing the secure account communication management techniques described herein, according to at least one example.
Figure 5:
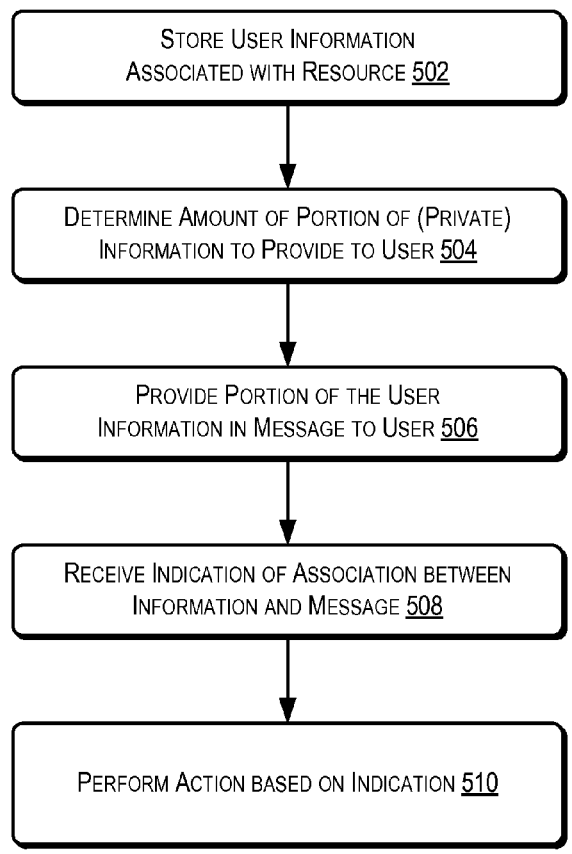
FIG. 5 illustrates another example flow diagram of a process for implementing the secure account communication management techniques described herein, according to at least one example.
Figure 6:
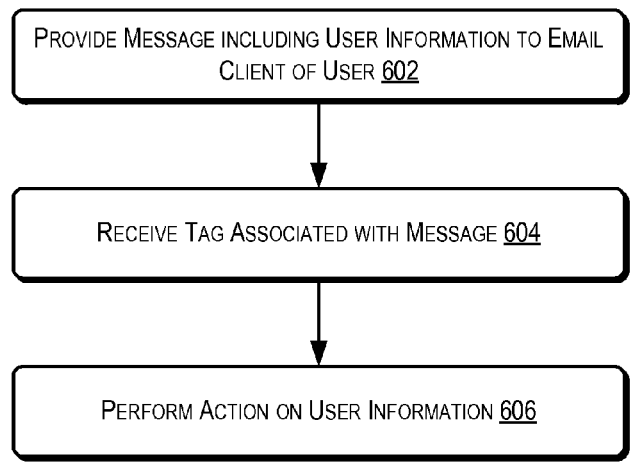
FIG. 6 illustrates another example flow diagram of a process for implementing the secure account communication management techniques described herein, according to at least one example.

FIGS. 4-6 illustrate example flow diagrams showing respective processes 400-600 for implementing secure account communication management. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 102 (e.g., utilizing at least one of the secure inbox module 236 and/or the resource management module 238) shown in FIG. 2 may perform the process 400 of FIG. 4. The process 400 may begin by including generation of an email for a user based at least in part on account information associated with the user at 402. In some examples, the process 400 may also include storing the email generated for the user at 404. At 406, the process 400 may also include receiving a registration of a computing device. The computing device may be associated with the user and/or the account. In some examples, the process 400 may include providing the message to the user at 408. At 410, the process 400 may include receiving a tag associated with the account. The tag may be received from the user and may be the result of the user interacting with the email and/or an email client of the user. At 412, the process 400 may also include determining when to perform an action based at least in part on the received tag. Alternatively, or in addition, the process 400 may include determining an action to be performed based at least in part on the tag at 414. Further, in some examples, the process 400 may end at 416 where the process 400 may include performing the determined action on the resource (e.g., based at least in part on the received tag).

FIG. 5 illustrates an example flow diagram showing process 500 for implementing dynamic network mirroring. The one or more service provider computers 102 (e.g., utilizing at least one of the secure inbox module 236 and/or the resource management module 238) shown in FIG. 2 may perform the process 500 of FIG. 5. The process 500 may begin by including storage of user information associated with a resource at 502. The resource may include a list of recipients of emails or a list of actions to be performed by the user. At 504, the process 500 may include determining an amount of a portion of information to provide to the user. In some examples, the information may be private and/or personal information (e.g., associated with user information, payment information, billing and/or shipping information, etc.) At 506, the process 500 may include providing a portion (e.g., the determined portion) of the user information in a message to the user. The message may be configured as a POP3 or an IMAP email message. The process 500 may also include receiving an indication of an association between information and the message 508. For example, as a result of interacting with the message, the user may have indicated an association between the information and the message. That is, the indication may include an association between a user order number and the order corresponding to the message. Other examples may include an indication of an association between a tag (e.g., "shipped," "printed," "opened," "read," etc.) and information corresponding to the message. In some examples, at 510, the process 500 may terminate by including performing an action based at least in part on the received indication. For example, if the indication is of an association between a user order number and the order of the email, the action may be to store the user order number in a table with the service provider order number (e.g., the order number assigned by the service provider and provided in the original email to the user).

FIG. 6 illustrates an example flow diagram showing process 600 for verifying network addresses. The one or more service provider computers 102 (e.g., utilizing at least one of the secure inbox module 236 and/or the resource management module 238) shown in FIG. 2 may perform the process 600 of FIG. 6. The process 600 may begin by providing a message including user information to an email client of a user at 602. In some aspects, the process 600 may also include receiving a tag associated with the message at 604. At 606, in some examples, the process 600 may terminate by performing an action on the user information provided in the message based at least in part on the received tag.

Illustrative methods and systems for implementing dynamic network mirroring are described above. Some or all of these systems and methods may, but need not, be implemented at least partially by architectures and processes such as those shown at least in FIGS. 1-6 above.

Figure 7:
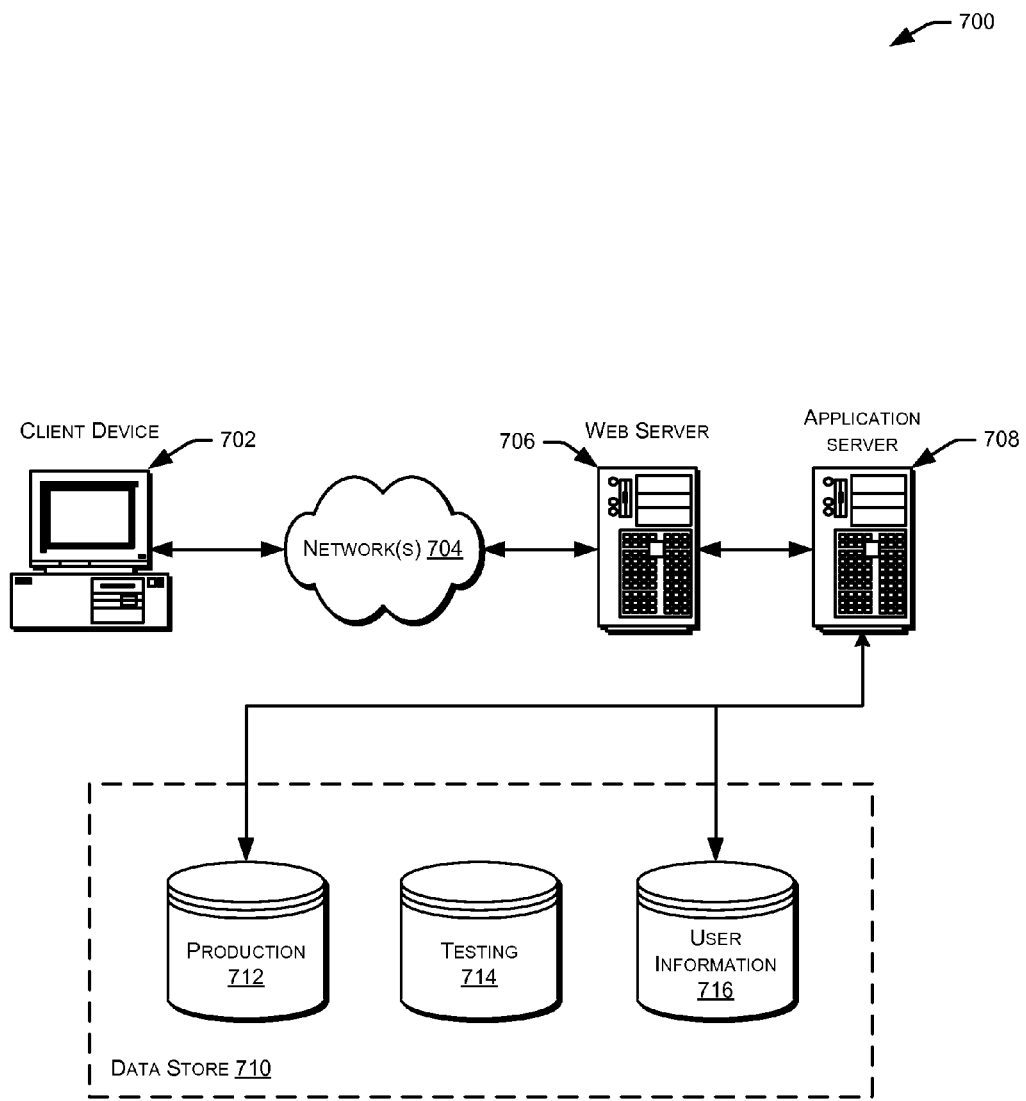
FIG. 7 illustrates an environment in which various embodiments of the secure account communication management techniques described herein can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing secure messages, comprising:
    storing, in a secure storage device of an electronic mail server that is managed by an entity that manages information corresponding to an electronic marketplace account of a user, an electronic mail message generated for the user, the electronic mail message identifying an item offered for sale by the user that was ordered by a customer of the electronic marketplace, the information maintained to be unavailable to other users including the customer;

receiving, by the electronic mail server, registration of a computing device of the user;

providing, by the electronic mail server, the electronic mail message to an electronic mail client of the computing device of the user utilizing a common message protocol, the electronic mail message configured to enable the user to provide an electronic tag associated with the electronic mail message, the electronic tag being related to the item ordered by the customer;

receiving, by the electronic mail server, the electronic tag related to the item ordered by the customer as a result of the user interacting with the electronic mail client of the computing device of the user, the electronic tag being received independent of electronic mail messages provided by the computing device of the user and via a proprietary protocol utilized by the electronic mail server;

updating, by the electronic mail server, a table comprising item information associated with the item ordered by the customer based at least in part on the received electronic tag; and transmitting, by the electronic mail server and to the customer, a notification about the table update on behalf of the user.

2. The computer-implemented method of claim 1, further comprising performing—at least one action including deleting the stored electronic mail message based at least in part on receiving the electronic tag.

3. The computer-implemented method of claim 1, further comprising:
determining at least one action to be performed based at least in part on the received electronic tag, the at least one action comprising at least one of reordering a list of emails, or associating a user with an authorization list, the at least one action being determined in response to receiving the electronic tag; and
performing the at least one action.

4. The computer-implemented method of claim 1, further comprising generating the electronic mail message for the user based at least in part on the customer ordering the item.

5. The computer-implemented method of claim 1, wherein the electronic tag indicates that the user has printed a shipping label associated with the item ordered by the customer or that the user has shipped the item ordered by the customer.

6. The computer-implemented method of claim 5, wherein the electronic mail message includes the shipping label.

7. A computer-implemented method for managing secure messages, comprising:
storing, by an electronic mail server managed by an electronic marketplace, user information associated with an item of the electronic marketplace that is offered by the user and that was ordered by a customer of the electronic marketplace;
providing, by the electronic mail server, at least a portion of the user information in a message to an electronic mail client of a computing device of the user utilizing a common message protocol, the message configured to enable the user to provide an electronic tag associated with the item ordered by the customer;
receiving, by the electronic mail server, the electronic tag associated with the item ordered by the customer as a result of the user interacting with the electronic mail client of the computing device of the user, the electronic tag being received independent of electronic mail messages provided by the computing device of the user and via a proprietary protocol utilized by the electronic mail server;
updating, by the electronic mail server, a table comprising item information associated with the item ordered by the customer based at least in part on the received electronic tag; and
transmitting, by the electronic mail server and to the customer, a notification about the table update on behalf of the user.

8. The computer-implemented method of claim 7, wherein the user information is private information that corresponds to the item.

9. The computer-implemented method of claim 8, further comprising determining which portion of the private information to provide in the message based at least in part on a setting configurable by the user.

10. The computer-implemented method of claim 7, wherein the electronic tag corresponds to an action performed by the user corresponding to the item.

11. A system for managing secure messages, comprising:
at least one memory that stores computer-executable instructions; and
at least one processor configured to access the at least one memory, wherein the at least one processor is configured to execute the computer-executable instructions to collectively at least:
store, at a secure storage device of an electronic mail server that is managed by an entity that manages information corresponding to an electronic marketplace account of a user, a message identifying an item offered for sale by the user that was ordered by a customer of the electronic marketplace;
provide the message to an electronic mail client of a computing device of the user utilizing a common message protocol, the message configured to enable the user to indicate an electronic tag associated with the item ordered by the customer;
receive the electronic tag associated with the item ordered by the customer as a result of the user interacting with the electronic mail client of the computing device, the electronic tag being received independent of electronic mail messages provided by the electronic mail client of the computing device and via a proprietary protocol utilized by the entity;
update a table comprising item information associated with the item ordered by the customer as a result of receiving the electronic tag; and
transmit, to the customer, a notification about the table update on behalf of the user.

12. The system of claim 11, wherein providing the message to the electronic mail client of the user is a result of the electronic mail client of the user being authenticated.

13. The system of claim 12, wherein the message includes a link to a secure portion of a website, the link configured to enable the user access the secure portion of the website without logging in to the website.

14. The system of claim 11, wherein the table includes at least a list of actions for the user to perform and modifying the table includes indicating that one or more of the actions has been performed by the user.

15. One or more non-transitory computer-readable media storing computer-executable instructions for managing secure messages that, when executed by one or more computer systems, configure the one or more computer systems to perform operations comprising:

storing a message in a secure storage device of an electronic mail server that is managed by an entity that manages information corresponding to an electronic marketplace account of a user, the message identifying an item offered for sale by the user that was ordered by a customer of the electronic marketplace;

providing, by the electronic mail server to an electronic mail client of the user, the message including at least a portion of the information corresponding to the user utilizing a common message protocol, the message configured to enable the user to indicate an electronic tag associated with the item ordered by the customer;

receiving, by the electronic mail server, the electronic tag associated with the item ordered by the customer as a result of the user interacting with the electronic mail client, the electronic tag being received independent of electronic mail messages provided by the user and via a proprietary protocol utilized by the electronic mail server;

updating, by the electronic mail server, a table comprising item information associated with the item ordered by the customer based at least in part on the received electronic tag; and transmitting, by the electronic mail server and to the customer, a notification about the table update on behalf of the user.

16. The one or more non-transitory computer-readable media of claim 15, wherein the information corresponding to the user is maintained to be unavailable to other users.

17. The one or more non-transitory computer-readable media of claim 15, wherein the operations further comprise storing an indication that an outstanding action item associated with the user is complete.

* * * * *